United States Patent

[11] 3,607,905

[72] Inventor Joseph L. Russell
Ridgewood, N.J.
[21] Appl. No. 706,511
[22] Filed Feb. 19, 1968
[45] Patented Sept. 21, 1971
[73] Assignee Halcon International, Inc.

[54] VAPORIZATION OF UNREACTED CYCLOHEXANE FROM CYCLOHEXANE OXIDATION PRODUCTS
3 Claims, 1 Drawing Fig.

[52] U.S. Cl. .................................................. 260/462,
260/586, 260/610, 260/631
[51] Int. Cl. .................................................. C07f 5/04,
C07c 35/08
[50] Field of Search .......................................... 260/462 A,
631 B

[56] References Cited
UNITED STATES PATENTS
3,239,552 3/1966 Feder et al. .................. 260/462 A
3,243,449 3/1966 Winnick ........................ 260/462 A
3,346,614 10/1967 Starks et al. .................. 260/462 A
3,439,041 4/1969 Gey et al. ...................... 260/631 B Primary Examiner—Leon Zitver
Assistant Examiner—Joseph E. Evans
Attorneys—William C. Long, Mario A. Monaco, Morris Wiseman and David Dick ABSTRACT: The present invention relates to a process for the oxidation of cyclohexane with molecular oxygen in the presence of boric acid-type additives to produce borate esters and is particularly concerned with vaporization of at least a part of the unreacted cyclohexane is the oxidation effluent under the conditions so as to minimize oxidation or oxygen transfer during this vaporization.

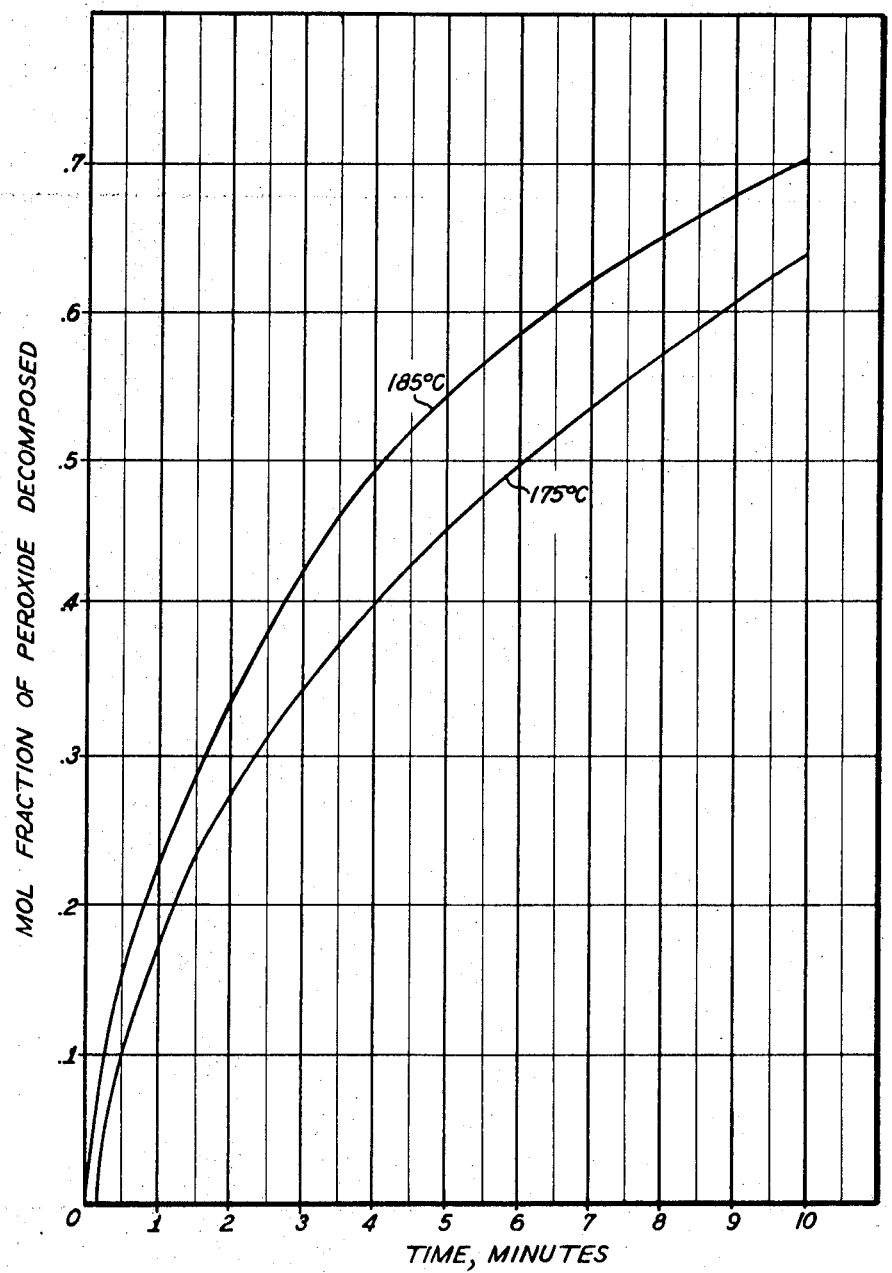

VAPORIZATION OF UNREACTED CYCLOHEXANE FROM CYCLOHEXANE OXIDATION PRODUCTS

BACKGROUND OF THE INVENTION

The oxidation of cyclohexane with molecular oxygen in the presence of boric acid-type additives has assumed very great importance in the chemical field. The borate ester mixtures resulting from this oxidation are readily converted to compounds including cyclohexanol and cyclohexanone which compounds in turn find great utility, for example, in the production of adipic acid caprolactum or the like.

The oxidation of cyclohexane in the presence of the boric acid additives is known and can be illustrated by reference to issued U.S. Pat. No. 3,243,449. In oxidations of cyclohexane it is generally necessary to provide heat to the reaction zone in order to maintain proper conditions for the oxidation. One such method of providing heat involves a vaporization of a portion of the cyclohexane which is being fed to the oxidation as fresh cyclohexane or as recycle condensate from the oxidation zones. U.S. Pat. No. 3,317,614 describes this operation.

In the oxidation of cyclohexane using a boric acid additive, it has been determined that it is particularly advantageous to subject the oxidation effluent to a vaporization whereby vapors of unreacted cyclohexane are separated and returned to the oxidation system. The reactor effluent mixtures comprise mainly unreacted cyclohexane together with an amount of unreacted boric acid additive and also contains borate ester, predominantly cyclohexyl meta borate, together with other cyclohexane oxidation products including cyclohexanone and various acidic and neutral materials. Also contained in the effluent mixture is a substantial quantity of peroxy oxygen containing materials, usually cyclohexyl hydroperoxide or cyclohexyl perborate. It has been found that the heating of this effluent in order to separate at least part of the cyclohexane as vapor when carried out in accordance with usual and conventional procedures results in certain inefficiencies in overall operation.

SUMMARY OF THE INVENTION

In accordance with the present invention, it has been discovered that the vaporization of the oxidation effluent mixtures above referrred to must be carried out under conditions so as to minimize oxygen transfer which occurs for example, through reduction of the peroxy oxygen compounds during the vaporization. Particularly, it is essential in accordance wit the present invention that the vaporization be carried out such that less than 50 percent of the peroxy oxygen is lost during the vaporization and preferably less than 30 percent.

BRIEF DESCRIPTION OF THE DRAWING

The accompanying drawing is a plot of percentage peroxide reacting as a function of time. The various curves illustrate the reaction at different temperatures.

DETAILED DESCRIPTION OF THE INVENTION

Illustrative conditions of temperature, pressure and amounts and types of boric acid additives used in the oxidation are fully set forth in U.S. Pat. No. 3,243,449 which is above referred to.

Practice of the present invention is applicable both to batch and continuous operation and in the latter case to continuous operations involving use of a series of separate reaction zones or to the use of a tower reactor.

In accordance with the invention, the peroxy compound containing oxidation effluent usually containing 5 to 30 weight percent peroxy compound based on the total of cyclohexane oxidation products is subjected to vaporization wherein the effluent is heated either by direct or indirect heat exchange. In the former case preheated vapor is directly contacted with the effluent (e.g. preheated nitrogen) in order to effect the desired vaporization of the cyclohexane. In the latter case, an indirect heat exchange is achieved through the use of appropriate indirect heat exchange means such as heating coils, heating jackets and the like known means.

As an essential aspect in preventing the excessive decomposition of the peroxy compounds in the vaporization zone, the residence time of the effluent in the vaporization zone is maintained less than about 5 minutes, at temperatures below 190° C. A preferred residence time in the vaporization zone is 3 minutes or less, preferably 0.5 to 2.0 minutes.

In order to effect vaporization the effluent is heated to a temperature of about 170° C. to 185° C. Higher or lower temperatures can be employed but the above temperature range has been found to be most suitable. Higher temperatures result in sizeable product loss and vaporizer fouling under any practical conditions. Lower temperatures are not high enough to be coupled with a boron promoted hydrocarbon oxidation.

Vaporizer pressure is desirably maintained slightly greater than that in the oxidation zones so as to facilitate flow of vaporized cyclohexane to the oxidation zones in order to provide heat thereto. Illustrative vaporizer pressures are 100 to 500 p.s.i.a.

The liquid passing from the vaporization zone can be readily cooled, e.g., to about 120° C. or less in order to prevent further loss of peroxy oxygen contained therein. Alternatively, the liquid from the vaporization zone can be subjected to a controlled heat soaking in accordance with the procedures of copending application Ser. No. 593,646, filed Nov. 29, 1966 in order to accomplish a highly selective peroxy compound decomposition; that is, the preferred alternate.

It has been found through practice of the present invention that significant and important improvements in process operation are achieved. To begin with, the proper regulation of the vaporization as above indicated results in an overall increase in oxidation selectively of several percent. Still further, it has been found that operational problems which accompany conventional vaporization operation are to a very real degree minimized or completely avoided.

Conventional vaporizer operation in such systems as here under consideration usually involve residence times in excess of about 5 minutes. In such conventional systems, high decomposition of peroxy oxygen occurs in the vaporizer and also there occurs the formation of solid or resinous deposition products which deposit on indirect heat exchange surfaces in the vaporizer thus causing very severe operational difficulties. Accompanying effects are lowered yields of the desired products and also decrease in the quality of the ultimate product.

Through practice of the present invention the problems associated with conventional practices are minimized or completely overcome. 1 avoiding excessive loss of peroxy oxygen in the vaporizer product yields are improved and the formation of resinous deposits with accompanying operational difficulties is avoided to a very considerable degree.

The following examples illustrate the invention;

EXAMPLE 1

Cyclohexane is continuously oxidized in a series of four agitated reactors. The oxidizing gas is air which is diluted by nitrogen to an oxygen content by volume of about 8 percent. The oxidation is carried out in each zone at a temperature of 165° C. and at a pressure of about 140 p.s.i.a. The conversion in each of the four reactors is about 2.0 percent of the cyclohexane equivalent (unreacted cyclohexane plus converted cyclohexane leaving the vaporizer. Vapors comprising cyclohexane, nitrogen, water, and the like are continuously removed from each reaction zone during the oxidation and these vapors are cooled and condensed. Upon decantation the unreacted cyclohexane is recovered and recycled to the oxidation.

The oxidation is carried out in the presence of meta boric acid which is incorporated with the cyclohexane fed to the first of the series of reactors. Meta boric acid is employed in an amount of 3 percent by weight of the cyclohexane fed to the first reactors.

Under the conditions of the oxidation heat is required in order to maintain the oxidation temperature. This is provided by vaporizing a portion of the cyclohexane in the effluent from the last reactor and returning this vapor to each of the four oxidation zones as needed in order to maintain the oxidation temperature therein.

Specifically, effluent from the last oxidation zone containing by weight 97.2 percent unreacted cyclohexane and 2.8 percent oxidation products of which 0.75 percent by weight represents compounds containing peroxy oxygen is passed at 165° C. to a vaporization zone wherein the effluent is heated by indirect heat exchange to a temperature of 175° C. Pressure in this vaporization zone is 147 p.s.i.a. As a result of this heating about 60 percent of the unreacted cyclohexane in the effluent is vaporized and the resulting vapors are distributed among the four oxidation zones in order to maintain the oxidizing conditions therein. Residence time in the vaporization zone is maintained at 1.5 minutes and there occurs a decomposition of about 23 percent of the peroxy oxygen contained in the effluent. The liquid from the vaporization zone passes to a heat soaking zone wherein liquid is maintained at a temperature of about 165° C. for 20 minutes in order to complete the peroxy compound decomposition under the conditions of optimum selectivity.

The reaction mixture is worked up in accordance with know procedures and an ultimate yield of cyclohexanol and cyclohexanone of 91 percent based on cyclohexane reacted is achieved. The oxidation is continued for prolonged periods of the order of several months without operational difficulties due to a formation of deposits on heat exchange surfaces in the vaporizer.

By way of contrast, wherein the vaporizer is similarly operated except that the residence time therein is 8 minutes, about 60 percent of the peroxy oxygen compounds are decomposed and the total yield of cyclohexanone and cyclohexanol based on cyclohexane converted drops to 87 percent. Also, importantly there is a severe problem in operation of the vaporizer due to the accumulation of resinous deposits on the heat exchange surfaces therein. This accumulation becomes apparent after only a few weeks of operation.

EXAMPLE 2

Example 1 is repeated except that the residence time in the vaporizer is maintained at 1 minute. Peroxide decomposition in the vaporizer drops to about 17.5 percent and the total yield of cyclohexanol and cyclohexanone based on cyclohexane converted rises to about 92.5 percent.

By way of comparison, the residence time in the vaporizer is increased to about 10 minutes and about 64 percent of there is decomposed in the vaporizer. Exceedingly severe problems of deposition in the vaporizer are encountered and the overall process selectivity drops to about 85.2 percent cyclohexanol plus cyclohexanone based on cyclohexane converted.

Reference is made to the drawing which accompanies the excessie specification. From an analysis of this drawing the marked effect of residence time in the vaporizer upon peroxide compound decomposition can be seen. In accordance with the present invention, this decomposition is maintained less than 50 percent and preferably less than 30 percent. At the appropriate vaporizer temperatures of 170° to about 185° C. it can be seen that the residence time must be maintained less than about 5 minutes at the lower temperatures and at the higher temperatures the residence time must be even lower in order to avoid excessive decomposition of peroxide in the vaporizer.

What is claimed is:

1. In a process for the vaporization of unreacted cyclohexane from a borate ester containing cyclohexane oxidation reaction mixture which also contains 5 to 30 percent peroxy oxygen compounds, based on the total of cyclohexane oxidation products, the improvement which comprises heating the mixture under a pressure of 100 to 500 p.s.i.a. to a temperature in the range of 170° to 185° C. for 0.5 to 5 minutes so that less than 50 percent loss of peroxy oxygen occurs and separating cyclohexane vapors during said heating.

2. A method of claim 1 wherein the liquid after removal of cyclohexane vapor is heat soaked at a temperature of 150°–170° C.

3. A method of claim 1 wherein the separated cyclohexane vapor is recycled to a cyclohexane oxidation step.